United States Patent [19]

White et al.

[11] 4,037,528
[45] July 26, 1977

[54] DENSITY CONTROL MECHANISM FOR CROP BALER

[75] Inventors: Allen Andrew White, Peabody; George Yatcilla; Harold Keith Garrison, both of Newton, all of Kans.

[73] Assignee: Hesston Corporation, Hesston, Kans.

[21] Appl. No.: 718,390

[22] Filed: Aug. 27, 1976

[51] Int. Cl.² .............................................. B30B 9/30
[52] U.S. Cl. ........................................ 100/191; 100/43
[58] Field of Search ........... 100/43, 191, 192, DIG. 8, 100/42, 232, 244, 264; 269/32, 267, 268

[56] References Cited

U.S. PATENT DOCUMENTS

| 802,410 | 10/1905 | Sanders | 100/191 X |
|---|---|---|---|
| 1,014,765 | 1/1912 | Luce | 100/232 X |
| 1,062,465 | 5/1913 | Hill | 100/264 |
| 1,221,767 | 4/1917 | Rowley | 100/232 X |
| 1,631,881 | 6/1927 | Murray | 100/191 |
| 2,823,603 | 2/1958 | Collins | 100/192 X |
| 3,024,719 | 3/1962 | Englund | 100/192 X |
| 3,294,013 | 12/1966 | Seltzer | 100/191 X |
| 3,350,999 | 11/1967 | Morse | 100/192 X |

*Primary Examiner*—Billy J. Wilhite
*Attorney, Agent, or Firm*—Schmidt, Johnson, Hovey & Williams

[57] ABSTRACT

The discharge end of a bale chamber may be constricted or enlarged such that bales being packed rearwardly through the chamber may be increased or decreased in density by regulating their resistance to exit from the chamber. Bell cranks at the four corners of the chamber are coupled with shiftable walls of the latter in such a way that pressure increases or decreases are simultaneously experienced by all of the walls upon introduction or release of hydraulic fluid to a pair of power devices which interconnect the two cranks on each side of the chamber. The two legs of each bell crank are of equal radial length with respect to the axis of swinging movement of the crank so that equal moment arms are produced by such legs to accomplish substantially uniform pressure around the bale within the chamber.

17 Claims, 4 Drawing Figures

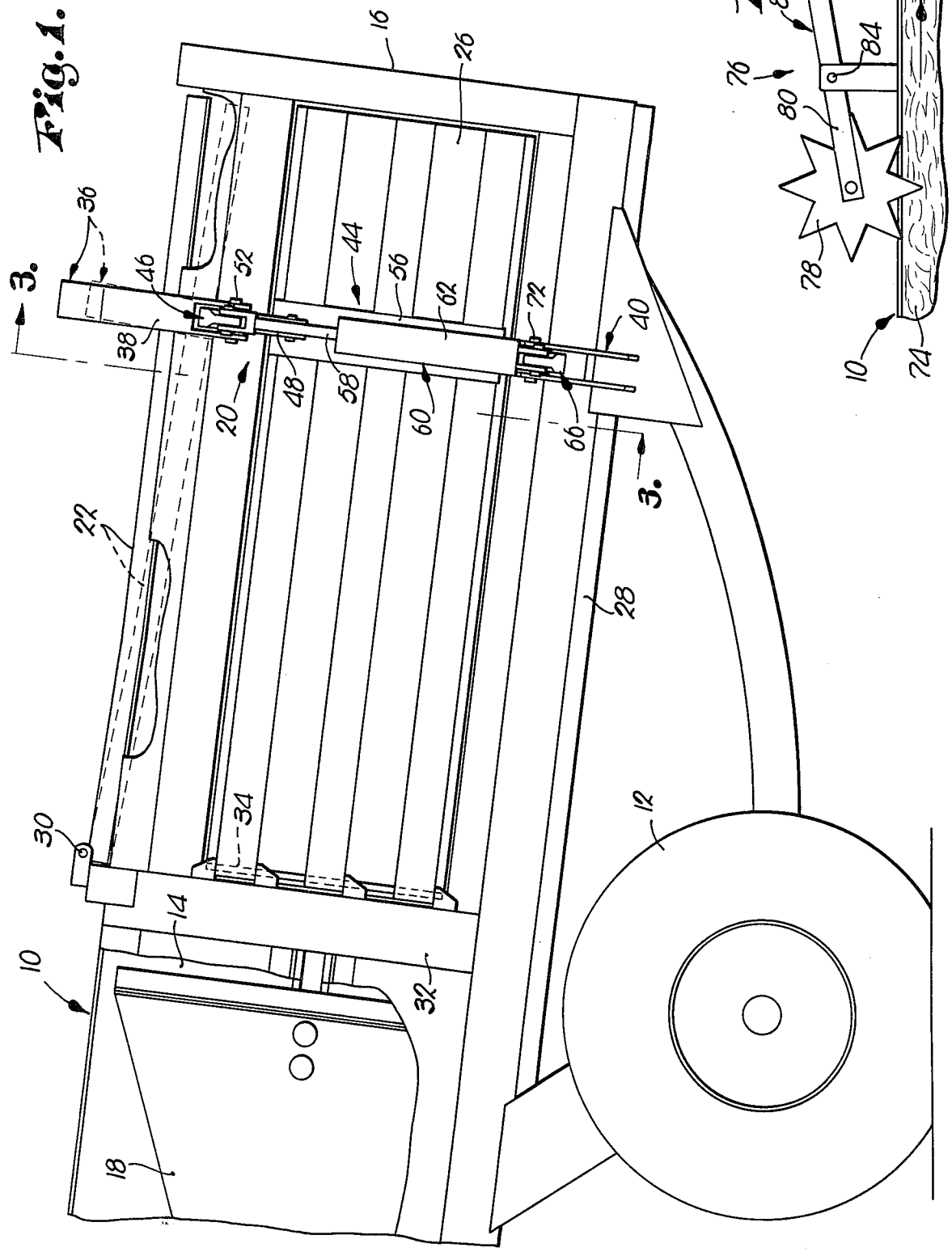

DENSITY CONTROL MECHANISM FOR CROP BALER

This invention relates to controlling the density of bales that are progressively formed by the intermittent rearward packing of additional charges of material against the bales as they move rearwardly through a baling chamber and out the discharge opening thereof. In particular, it relates not to the density sensing aspect of such controls, but rather, to the mechanical means for adjusting the size of the discharge opening, or at least the pressure on shiftable walls of the opening, such as to increase or decrease the resistance which the bale experiences as it progresses toward the discharge opening While many types of hydraulically operated "squeeze" mechanisms are presently available on numerous balers, some are so simple that they are unable to apply the proper uniform pressure that is desired around the entire perimeter of the bale, while others are so complex that their costs are prohibitive from the standpoints of both initial purchase and subsequent repair and replacement.

Accordingly, one important object of the present invention is to provide a squeeze-type density control mechanism which is capable of applying substantially equal pressure around the bale as it moves through the chamber but without the complexities typically found in prior squeeze mechanisms.

Another important object of this invention is to provide a mechanism as aforesaid that is fully operable to accomplish such uniform action where one wall of the chamber may be stationary and all others are shiftable, rather than having all four walls adjustable.

An additional important object of this invention is to provide a way of accomplishing simultaneous pressure adjustment in two shiftable walls of the chamber by using only one power device, thereby simplifying the operation and decreasing overall costs.

A still further important object of this invention is to provide squeeze mechanism which is capable of carrying out the foregoing objects, yet which is equally well-suited for utilizing either single-acting or double-acting power devices.

Examples of prior mechanisms at least somewhat related to the subject matter herein may be listed as follows: U.S. Pat. Nos. 1,221,767, Rowley, et al.; 1,014,765, Luce; 1,062,465, Hill; 3,024,719, Englund; 3,294,013, Seltzer 3,350,999, Morse.

In the drawings:

FIG. 1 is a fragmentary, elevational view of the normally rear, discharge end of a baler utilizing density control mechanism in accordance with the principles of the present invention;

FIG. 2 is an enlarged, schematic, fragmentary view of conventional sensing means for actuating the mechanism to either increase or decrease bale density;

Figure 3:
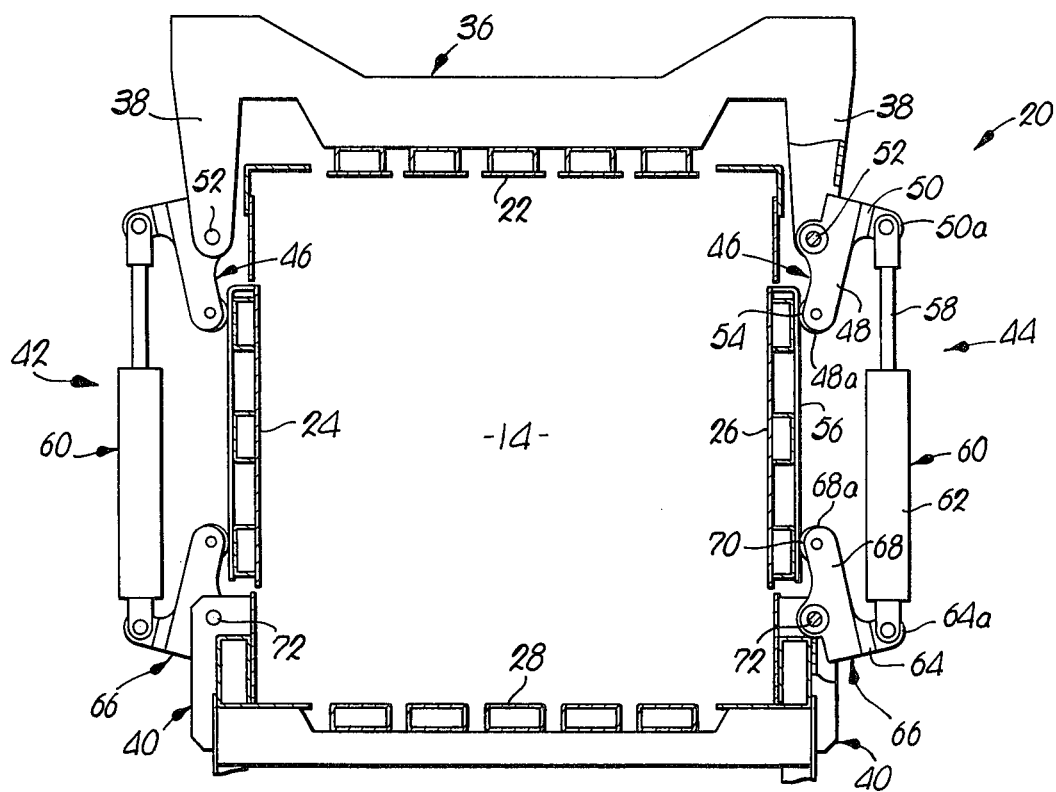
FIG. 3 is a slightly enlarged, cross-sectional view of the baler taken along line 3—3 of FIG. 1 and illustrating the mechanism in its normally expanded condition.

The baler has a normally fore-and-aft extending bale case 10 supported for over-the-ground travel by ground wheels 12 (only one being shown). As the baler is advanced along a crop windrow, the crop is picked up and loaded into the bale chamber 14 of case 10 by apparatus not shown, but in any event, not relevant to the principles of the present invention. The successive charges of material are repetitively packed rearwardly toward the open discharge end 16 of the case 10 by a reciprocating plunger 18, and such rearward travel of the material within chamber 14 is resisted by squeeze mechanism 20 operating in conjunction with the top, two side and bottom walls 22, 24, 26 and 28, respectively, of the bale case 10 rearwardly of the plunger 18.

The top wall 22 has a horizontal pivot 30 with a stationary framing 32 of the case 10 located just behind the plunger 18, the top wall 22 thereby being swingably vertically about pivot 30 between the solid and broken line positions illustrated in FIG. 1. Similarly, the two sidewalls 24 and 26 have individual vertical pivots 34 with the framing 32 (only the pivot 34 of the sidewall 26 being illustrated) so that the sidewalls 24 and 26 are horizontally swingable toward and away from one another about the pivots 34. On the other hand, in the illustrated embodiment the bottom wall 28 is stationary, although it is to be understood that the principles of the present invention extend and apply equally to having bottom wall 28 vertically swingable to the same extent as the top wall 22.

Figure 4:
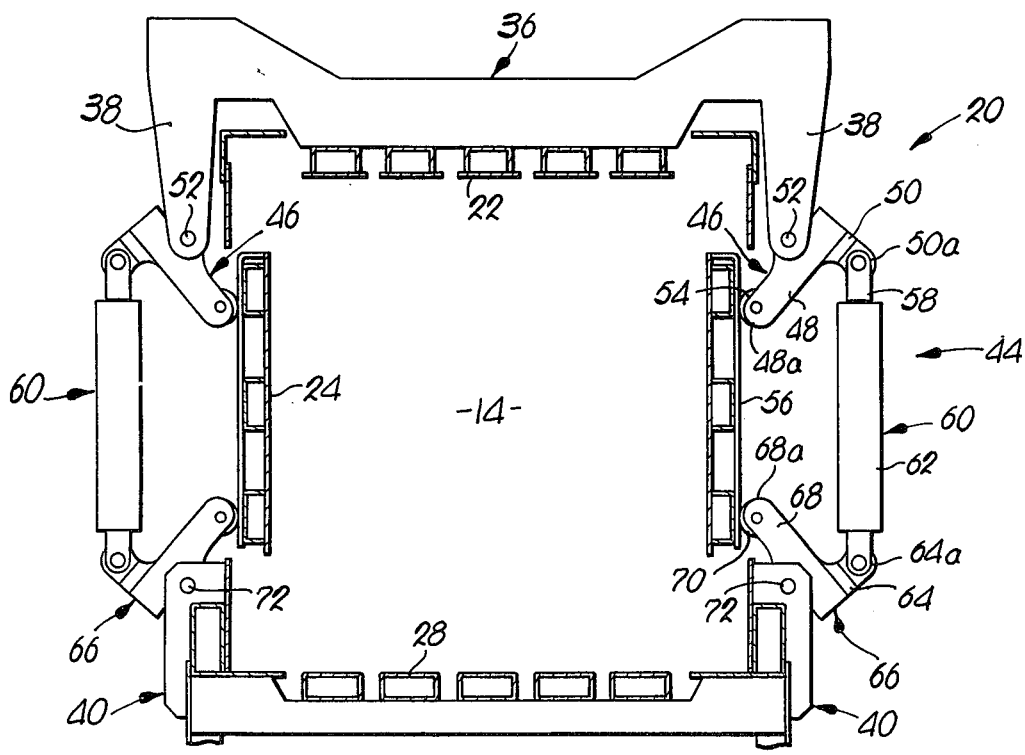
FIG. 4 is a cross-sectional view similar to FIG. 3, but showing the mechanism fully contracted for maximum bale density.

By virtue of this mounting arrangement for the walls 24–28, the chamber 14 may be constricted or enlarged depending upon the relative positions of the walls 22–28, such relationship being an integral part of the way in which the density is controlled. It is important also to recognize that, while the opposed sidewalls 24 and 26 are not truly parallel to one another in all positions of their relative swinging movement, nor are the top and bottom walls 22 and 28, for that matter, they do remain at least substantially parallel when viewed in vertical cross-section as in FIGS. 3 and 4, and this relationship should be kept in mind when determining the scope of the claims at the conclusion of this description. Moreover, while the top wall 22 and the sidewall 26, for example, are not truly perpendicular to one another throughout all positions of their individual swinging movements, as illustrated in FIGS. 3 and 4, they do remain at least substantially perpendicular when viewed in vertical cross-section such that this relationship should also be kept in mind when interpreting the scope of the claims.

The top wall 22 carries a generally "M-shaped" member 36 (as viewed in FIGS. 3 and 4) that spans the entire bale case 10 somewhat adjacent the rear of the latter. The member 36 is rigidly attached to the top wall 22 for movement with the latter about pivot 30 and has a pair of depending arms 38 which project downwardly along opposite sides of the bale case 10 toward the sidewalls 24 and 26. On the other hand, the bottom wall 28 has a pair of bifurcated, upright mounting lugs 40 that are rigidly connected therewith on opposite sides of the case 10, and it is between these two sets of arms 38 and lugs 40 that the squeeze mechanism 20 is positioned.

The mechanism 20 comprises a pair of identical assemblies 42 and 44 on opposite sides of the case 10, and in view of such identity, only the assembly 44 will be described in detail. The assembly 44 includes a first bell crank 46 for the top wall 22, and the crank 46 has a pair of diverging legs 48 and 50 provided with outermost ends 48a and 50a, respectively. The proximal arm 38 is bifurcated in the vicinity of the crank 46 such as to straddle the latter and provide room for a generally horizontal, fore-and-aft extending pivot 52 that mounts the crank 46 on the member 36. Anti-friction means in the form of a roller 54 is carried by the end 48a of leg 48 for rolling engagement with an upright wear plate 56 on the sidewall 26.

On the other hand, the end 50a of leg 50 is pivotally connected to the rod 58 of a piston and cylinder device 60, the latter being either single or double-acting as may be necessary or desirable. The cylinder 62 of the device 60 is, in turn, pivotally connected to the outer end 64a of leg 64 belonging to a second bell crank 66 of the assembly 44. As with the crank 46, the crank 66 has a leg 68 which diverges from the leg 64 and has an outer end 68a carrying an anti-friction roller 70 that is engageable with the bottom portion of wear plate 56. A substantially horizontal, fore-and-aft extending pivot 72 mounts the crank 66 on the bottom wall 28 through the bifurcated lugs 40, and the pivot 72 is intermediate the opposite ends 64a and 68a. Both ends 64a and 68a are equally spaced radially from the pivot 72, as are the ends 48a and 50a from the pivot 52. Consequently, the moment arms created by legs 64, 68 and 48, 50, are all equal to one another as the cranks 46 and 66 are rocked by the device 60. This is important insofar as obtaining uniform "squeeze" on the bale is concerned.

FIG. 2 illustrates a bale 74 moving rearwardly through the case 10 wherein its density is sensed by a sensor 76 of conventional construction. The sensor 76 does not form a part of the squeeze mechanism 20 and its particular nature of construction is not important insofar as operation of the mechanism 20 is concerned. For a clear understanding of the mechanism 20, however, the typical sensor 76 will be explained as follows.

A multipronged star wheel 78 is rotatably mounted on one end 80 of a lever 82 having a fulcrum 84 at its midpoint. The opposite end 86 of the lever 82 carries a depending actuator 88 for a control valve 90 that determines the extent and direction of hydraulic fluid flow to the power devices 60 through hydraulic lines 92 and 94.

Although the sensor 76 in most cases employs additional apparatus to that just described, suffice it to point out that the extent to which the star wheel 78 penetrates the bale 74 during its rearward movement determines the way in which the control valve 90 is operated by the actuator 88. If the star wheel 78 penetrates more than a predetermined amount, the bale 74 is less dense than desired and, consequently, control valve 90 causes additional hydraulic fluid to flow to the mechanism 20 to constrict or at least further pressurize the chamber 14. On the other hand, if the star wheel 78 penetrates less deeply than a predetermined amount, the control 90 allows the release or causes the positive pumping of fluid from the mechanism 20 so as to enlarge the chamber 14.

Assuming that the mechanism 20 is in the relatively expanded condition illustrated in FIG. 2, when hydraulic fluid is delivered under pressure to the devices 60, the rods 58 attempt to retract so as to pull the crank arms 50 and 64 toward one another, the extent of such retraction depending upon the pressure being exerted laterally by the bale within the chamber 14. Assuming that the rods 58 do in fact retract, this has the effect of not only rocking the cranks 46 and 66 inwardly so as to shift the sidewalls 24 and 26 inwardly, but also of pulling downwardly on the pivots 52 so as to shift the tope wall 22 inwardly. Consequently, the chamber 14 becomes constricted, perhaps as far as the relationship illustrated in FIG. 4. Thus, resistance to bale movement is increased with the effect that the density is correspondingly increased.

Note that such inward shifting of the top wall 22 and the sidewalls 24, 26 is simultaneous inasmuch as all cranks 46 and 66 are actuated at the same time by the devices 60. Moreover, it is to be pointed out that the compactive pressure or "squeeze" around the bale is substantially uniform from the hydraulic devices 60 inasmuch as all moment arms of the cranks 46 and 66 are equal in magnitude to one another. Consequently, a predetermined density level can be achieved uniformly throughout the bale to the end that a bale having the desired qualities of density and configuration can be obtained.

Although in the illustrated embodiment the bottom wall 28 is not shiftable, it should be apparent that the wall 28 could be hinged in the same manner as the top wall 22 such that all four sides of the case 10 could be adjustably positioned by the mechanism 20. In that event, the pull exerted by the devices 60 during retraction of the rods 58 would displace both the upper cranks 46 and the lower cranks 66 toward one another so as to accordingly shift the top and bottom walls 22 and 28. The sidewalls 24 and 26 would continue to be inwardly shifted as a result of the rocking action of the cranks 46 and 66.

Assuming now that the mechanism 20 is in the extreme constricted condition thereof illustrated in FIG. 4, an indication by the sensor 76 that bale density is excessive can either cause fluid to be pumped from the devices 60 or simply released therefrom as may be necessary or desirable depending upon the particular hydraulic circuitry that accompanies the sensor 76 and the mechanism 20. In either situation, the result is that the rods 58 become extended toward their FIG. 3 positions such that the cranks 46 and 66 are rocked outwardly and are displaced relatively away from one another in a vertical direction. This, of course, allows the sidewalls 24 and 26 to shift outwardly and causes the upper wall 22 to be raised by the same amount. Again, inasmuch as all moment arms for the cranks 46 and 66 are equal in magnitude, the walls 22, 24 and 26 all shift outwardly to the same extent and, when they stop, equal pressure is applied all around the bale in the desired manner.

Having thus described the invention, what is claimed as new and desired to be secured by Letters Patent is:

1. In combination with a variable dimension bale chamber having a pair of mutually perpendicular, inwardly and outwardly shiftable walls that coverge toward one corner of the chamber, mechanism for controlling said shifting of the walls including:
   a bell crank having a pair of diverging legs provided with outer ends;
   structure swingably connecting said crank to one of said walls between said ends;
   means for operably coupling the end of one leg with the other of said wall; and
   power means coupled with the other leg for rocking the crank and simultaneously displacing the same in a direction to inwardly shift said walls.

2. In the combination as claimed in claim 1, wherein said power means includes a fluid pressure, piston and cylinder device.

3. In the combination as claimed in claim 2, wherein said device is connected to said other leg of the crank at said end thereof.

4. In the combination as claimed in claim 3, wherein said ends of the crank legs are equally radially spaced from the axis of swinging movement of the crank.

5. In the combination as claimed in claim 1, wherein said operable coupling means includes anti-friction means at said end of the one leg disposed for engagement with said other wall.

6. In the combination as claimed to claim 5, wherein said anti-friction means includes a roller rotatably mounted on said end of the one leg.

7. In combination with a variable dimension bale chamber having at least one pair of inwardly and outwardly shiftable walls that are opposed to one another, plus at least one additional inwardly and outwardly shiftable wall that is perpendicular to said opposed walls, mechanism for controlling said shifting of the walls including:
 a pair of bell cranks each having first and second relatively diverging legs provided with outer ends;
 structure swingably mounting both of said cranks on said perpendicular wall adjacent opposite ones of said opposed walls,
 each crank being swingable about an axis located intermediate its opposite leg ends;
 means for operably coupling said first legs of the cranks with opposite ones of said opposed walls; and
 power means operably coupled with said second legs of the cranks for rocking and simultaneously displacing the cranks in directions to inwardly shift said opposed and said perpendicular walls.

8. In the combination as claimed in claim 7, wherein said power means includes a fluid pressure piston and cylinder device for each crank, respectively.

9. In the combination as claimed in claim 8, wherein each of said devices is connected to the end of its corresponding other crank leg.

10. In the combination as claimed in claim 9, wherein said ends of the crank legs are equally radially spaced from said axes of swinging movement of the respective cranks.

11. In the combination as claimed in claim 7, wherein said operable coupling means includesan anti-friction roller at the end of each of said first legs, respectively, said rollers being disposed for engagement with their respective, said opposed walls.

12. In the combination as claimed in claim 7, wherein said chamber is further provided with a second perpendicular wall disposed in spaced opposition to said first-mentioned perpendicular wall, said mechanism further including:
 a second pair of bell cranks each having first and second relatively diverging legs provided with outer ends;
 second structure swingably mounting both of said second cranks on said second perpendicular wall adjacent opposite ones of said opposed walls,
 each of said second cranks being swingable about an axis located intermediate its opposite leg ends; and
 second means for operably coupling said first legs of the second cranks with opposite ones of said opposed walls at locations spaced from the first-mentioned cranks,
 said second legs of the second cranks being operably coupled with said power means for the first-mentioned cranks whereby to actuate all cranks simultaneously.

13. In the combination as claimed in claim 12, wherein said second perpendicular wall is stationary relative to the other walls.

14. In the combination as claimed in claim 12, wherein said power means includes a fluid-pressure piston and cylinder device between the cranks for each of said opposed walls, respectively.

15. In the combination as claimed in claim 14, wherein the ends of said first legs of the cranks are provided with means for anti-friction engagement with their corresponding said opposed walls during rocking and displacement of the cranks to effect said operable coupling of the cranks with said opposed walls.

16. In the combination as claimed in claim 14, wherein said leg ends of each crank are equally spaced radially from the axis of swinging movement of the crank, said power devices in each instance being coupled with a said second leg at said end thereof.

17. In the combination as claimed in claim 16, wherein said perpendicular wall is stationary relative to the other walls.

* * * * *